Patented July 11, 1933

1,917,890

UNITED STATES PATENT OFFICE

THERESA SUSEMIHL KERR, OF BUFFALO, NEW YORK, ASSIGNOR TO NATIONAL ANILINE AND CHEMICAL COMPANY, OF NEW YORK, N. Y., A CORPORATION OF NEW YORK

PRODUCTION OF ARYLIDES OF 2.3-HYDROXYNAPHTHOIC ACID

No Drawing.   Application filed July 14, 1931.   Serial No. 550,811

My invention relates to the production of arylides of 2.3-hydroxynaphthoic acid, and particularly to improved methods of producing the same whereby a high yield is obtained and a product of high purity is produced.

The arylides of 2.3-hydroxynaphthoic acid are employed as intermediate products in the production of certain classes of dyes and are also used in the production of other intermediates. Heretofore the arylides have been produced by treating a mixture containing 2.3-hydroxynaphthoic acid and an arylamine with a halide such as phosphorous trichloride or thionyl chloride. The amount of the phosphorous trichloride or other halide used in carrying out the reaction has heretofore been in large excess, e. g., from 30 to 150 per cent excess, of the theoretical amount required to produce the halide of the acid.

I have discovered that by first treating the 2.3-hydroxynaphthoic acid with a material capable of reacting with said acid to produce an acid halide and subsequently reacting the resultant mixture, which presumably contains 2.3-hydroxynaphthoyl halide, with an arylamine, the yield and purity of the product obtained are materially improved over that obtained by processes heretofore employed. Further, I have discovered that the use of a large excess of the halide over the theoretical amount required to produce 2.3-hydroxynaphthoyl chloride tends to reduce the yield and the quality of the resulting arylide of the 2.3-hydroxynaphthoic acid produced.

Among the objects of my invention are to provide an improved process for producing the arylides of 2.3-hydroxynaphthoic acid, to increase the yield of the product obtained by the reaction over that heretofore obtainable, to produce an arylide of 2.3-hydroxynaphthoic acid of high purity, and to reduce the amount of acid halide forming material employed in carrying out the process. These and other objects and features of my invention will appear from the following description thereof.

In accordance with my invention I first treat 2.3-hydroxynaphthoic acid, preferably in the presence of an indifferent solvent or diluent liquid, with a halide capable of reacting with the acid to produce the corresponding acid halide. Thereafter I react the resulting mixture with an arylamine. The solvent or diluent liquid employed is preferably a liquid chlorbenzene, particularly monochlorbenzene, although other indifferent solvents or diluents may be used, such as liquid aromatic and aliphatic hydrocarbons and their halogen and other derivatives, ethers, etc. The diluent materials employed are preferably non-aqueous materials which are immiscible with water and which have a boiling point of 110° C. or above, more particularly about 130° C. or higher.

The halides employed in carrying out the process may be phosphorus trichloride, phosphorous oxychloride, thionyl chloride or other chlorides or halides which upon interaction with 2.3-hydroxynaphthoic acid are capable of yielding the corresponding acid halides. The arylamine used in producing the arylides of 2.3-hydroxynaphthoic acid will depend in each case upon the product desired. I may, for instance, employ a primary or secondary aromatic amine, such as the primary and secondary amines of the benzene, diphenyl, and naphthalene, etc. series, including their alkyl-, chloronitro-, hydroxy-, alkoxy-, carboxy-, and amino-derivatives (as for example, aniline, o-toluidine, alpha- or beta-naphthylamine, tetrahydro-alpha-naphthylamine, N-ethylaniline, 2.5- and other mono- and di-chloranilines, chlorotoluidines, o-aminophenol, 1.3- or 1.4- or 1.5- or 1.6- or 1.7- or 2.6- or 2.7- aminonaphthol, anisidines, cresidine, 4-chloro-o-anisidine, aminonaphthol ethers, mono- or para-aminobenzoic acid, cresotinic acid, para-aminosalicylic acid, 2.4-tolylenediamine, phenylenediamine, benzidine, tolidine, dianisidine, etc.).

In carrying out the process in accordance with my invention, I employ substantially the theoretical amount of halide required for reaction with the acid to produce the acid halide. I may employ from 1 to 10% in excess of that theoretically required for the reaction, but I have found that the presence of a large excess of the halide in the reaction mixture tends to reduce the yield and decrease the quality of the resulting product. I therefore intend that the expression "substantially the theoretical amount" of a halide as hereinafter employed in the specification and claims shall include a small excess of the halide, such as 1 to 10%. I prefer to use about the theoretical amount of the arylamine required for the reaction although I may in some instances employ an excess of the arylamine.

In order that my invention will be more clearly understood, the following example is given by way of illustration of the preferred method of carrying out my invention. However, my invention is not limited to the specific example cited and I therefore do not intend that my invention should be restricted to the particular method recited therein.

*Example.*—To a well-stirred mixture of 60 parts by weight of 2.3-hydroxynaphthoic acid and 510 parts of mono-chlorbenzene there is slowly added 15 parts of phosphorus trichloride; the mixture is stirred at room temperature for about 10 to 15 hours and thereafter 35 parts of o-toluidine are gradually introduced into the well-stirred mixture. The mixture is heated to 110° C. under a reflux condenser until the evolution of hydrogen chloride has greatly diminished, and then the mixture is heated to boiling, i. e., refluxing temperature which is about 132° C., until practically no more hydrogen chloride is evolved. The resulting solution of the arylide is then added to an iced aqueous solution of sodium carbonate containing an amount of sodium carbonate in slight excess of that required to effect the neutralization of any acid which may be present. The o-toluidide of 2.3-hydroxynaphthoic acid is thus obtained in the form of an insoluble precipitate, which is filtered off and washed with warm water.

While I have described a process in which the arylide is precipitated by addition of the reaction mixture to an iced solution of sodium carbonate (soda ash), it may be desirable in some instances to effect the precipitation of the arylide directly from the diluent in a non-aqueous mixture by the use of a diluent material in which the arylide is insoluble. When a diluent of this type is employed, the resulting arylide is obtained directly by filtration. For example, when producing the arylides of aniline or m-nitraniline and 2.3-hydroxynaphthoic acid, I may employ chlorbenzene as the diluent for the acid. The arylide produced is insoluble in chlorbenzene and therefore may be obtained by filtration and without addition of the reaction mixture to an aqueous solution.

The yield and quality of the arylide of 2.3-hydroxynaphthoic acid thus obtained by the process as above described is superior to that obtained when a mixture of the acid and the arylamine is treated with phosphorous trichloride or other halide capable of yielding acid halides as in the method previously employed. It will also be noted in carrying out my process that the amount of phosphorous trichloride or other halide employed is only about 70 to 85% of that heretofore employed when the acid and amine were mixed prior to treatment with the halide. The increase in yield and purity of the product obtained and the decrease in the amount of the reacting materials used in carrying out my process, thus constitute a very material improvement over processes heretofore employed in producing the arylides of 2.3-hydroxynaphthoic acid.

It will be understood from the foregoing description of my invention that the details employed in carrying out my process can be varied over a wide range of conditions, such as temperature, time of reaction and quantities of material employed, and therefore I do not intend my invention shall be limited by the foregoing example illustrative of the preferred form of my invention, except as defined by the claims.

I claim:

1. A process for making an arylide of 2.3-hydroxynaphthoic acid which comprises first reacting 2.3-hydroxynaphthoic acid with a halide capable of reacting with said acid to produce an acid halide, and subsequently reacting the resulting mixture with an arylamine.

2. A process for making an arylide of 2.3-hydroxynaphthoic acid which comprises first treating 2.3-hydroxynaphthoic acid with substantially the theoretical amount of a halide capable of reacting with said acid to produce an acid halide, and subsequently reacting the resulting mixture with an arylamine.

3. A process for making an arylide of 2.3-hydroxynaphthoic acid which comprises first acting 2.3-hydroxynaphthoic acid in an indifferent diluent which is immiscible with water with substantially the theoretical amount of a halide capable of reacting with said acid to produce an acid halide, and subsequently reacting the resulting mixture with an arylamine.

4. A process for making an arylide of 2.3-hydroxynaphthoic acid which comprises first treating 2.3-hydroxynaphthoic acid with substantially the theoretical amount of a halide capable of reacting with said acid to produce an acid halide, and subsequently reacting the resulting mixture with substantially the theoretical amount of an arylamine.

5. A process for making an arylide of 2.3-hydroxynaphthoic acid which comprises first treating 2.3-hydroxynaphthoic acid with substantially the theoretical amount of phosphorous trichloride in the presence of an indifferent diluent, and subsequently reacting the resulting mixture with an arylamine.

6. A process for making an arylide of 2.3- hydroxynaphthoic acid which comprises first reacting 2.3-hydroxynaphthoic acid with phosphorous trichloride, and subsequently reacting the resulting mixture with an arylamine.

7. A process for making the o-toluidide of 2.3-hydroxynaphthoic acid which comprises first reacting 2.3-hydroxynaphthoic acid with substantially the theoretical amount of phosphorous trichloride in the presence of an indifferent diluent, and subsequently reacting the resulting mixture with o-toluidine.

8. A process for making an arylide of 2.3-hydroxynaphthoic acid which comprises first reacting 2.3-hydroxynaphthoic acid with substantially the theoretical amount of a halide capable of reacting with said acid to produce an acid halide, subsequently adding an arylamine to the resulting mixture and heating the same.

9. A process for making an arylide of 2.3-hydroxynaphthoic acid which comprises first reacting 2.3-hydroxynaphthoic acid in the presence of an indifferent diluent in which the arylide to be produced is insoluble with substantially the theoretical amount of a halide capable of reacting with said acid to produce an acid halide, subsequently reacting the resulting mixture with an arylamine selected from the amines of the benzene and naphthalene series, and separating the arylide of 2.3-hydroxynaphthoic acid thus produced from said indifferent diluent.

10. A process of making the o-toluidide of 2.3-hydroxynaphthoic acid which comprises slowly adding substantially the theoretical amount of phosphorous trichloride to 2.3-hydroxynaphthoic acid and chlorbenzene, to produce the acid chloride, stirring the mixture at room temperature, subsequently gradually adding to the reaction mixture substantially the theoretical amount of o-toluidine required to form the o-toluidide of the acid, heating the mixture at about 110° C. with refluxing until the evolution of hydrogen chloride has diminished, then heating the mixture to boiling until no more hydrogen chloride is evolved, adding the resulting mixture to an iced aqueous solution of sodium carbonate in which the sodium carbonate is present in excess of that required to effect neutralization of any acid that may be present in the mixture, whereby the o-toluidide of 2.3-hydroxynaphthoic acid is precipitated, filtering off the precipitate, and washing the precipitate with warm water.

11. A process for making an arylide of 2.3-hydroxynaphthoic acid which comprises first reacting 2.3-hydroxynaphthoic acid in a non-aqueous medium with a halide capable of reacting with said acid to produce an acid halide, and subsequently reacting the resulting mixture with an arylamine selected from the amines of the benzene and naphthalene series.

12. A process for making an arylide of 2.3-hydroxynaphthoic acid which comprises first reacting 2.3-hydroxynaphthoic acid with substantially the theoretical amount of a halide selected from the group consisting of phosphorous trichloride, phosphorous oxychloride and thionyl chloride, and subsequently reacting the resulting mixture with an arylamine.

13. A process for making an arylide of 2.3-hydroxynaphthoic acid which comprises first reacting 2.3-hydroxynaphthoic acid in the presence of an indifferent diluent with substantially the theoretical amount of a halide selected from the group consisting of phosphorous trichloride, phosphorous oxychloride and thionyl chloride, and subsequently reacting the resulting mixture with an arylamine selected from the amines of the benzene and naphthalene series.

In witness whereof, I have hereunto set my hand.

THERESA SUSEMIHL KERR.

CERTIFICATE OF CORRECTION.

Patent No. 1,917,890.                                                      July 11, 1933.

THERESA SUSEMIHL KERR.

It is hereby certified that error appears in the printed specification of the above numbered patent requiring correction as follows: Page 2, line 108, claim 3, for "acting" read "reacting"; and that the said Letters Patent should be read with this correction therein that the same may conform to the record of the case in the Patent Office.

Signed and sealed this 22nd day of August, A. D. 1933.

M. J. Moore.

(Seal)                                               Acting Commissioner of Patents.